United States Patent

Iwata

[11] Patent Number: 5,899,290
[45] Date of Patent: May 4, 1999

[54] ENGINE OUTPUT CONTROL APPARATUS

[75] Inventor: Toru Iwata, Yokohama, Japan

[73] Assignee: Nissan Motor Co., Ltd., Yokohama, Japan

[21] Appl. No.: 08/662,950

[22] Filed: Jun. 13, 1996

[30] Foreign Application Priority Data

Jun. 19, 1995 [JP] Japan .................................. 7-151774

[51] Int. Cl.$^6$ ................................................ B60K 41/00
[52] U.S. Cl. .............................. 180/197; 701/85; 701/86; 477/120
[58] Field of Search .............................. 180/197; 701/84, 701/85, 86, 87; 477/120

[56] References Cited

U.S. PATENT DOCUMENTS

| 5,001,943 | 3/1991 | Fujita ................................. 364/426.033 |
| 5,079,704 | 1/1992 | Sakai et al. . | |
| 5,191,953 | 3/1993 | Ito et al. .................................. 180/197 |
| 5,262,952 | 11/1993 | Tsuyama et al. ........................ 180/197 |
| 5,297,662 | 3/1994 | Tsuyama et al. ........................ 180/197 |
| 5,405,301 | 4/1995 | Yagi et al. ............................... 180/197 |

*Primary Examiner*—Anthony Knight
*Assistant Examiner*—John L. Beres
*Attorney, Agent, or Firm*—Foley & Lardner

[57] ABSTRACT

An engine output control apparatus for use with an automotive vehicle supported on a road surface by a pair of driven road wheels and a pair of non-driven road wheels to control an output transmitted from an internal combustion engine to the driven road wheels through an automatic transmission adapted to produce changes up based on engine output and vehicle speed. A traction control signal is produced when the degree of slip of the driven road wheels is equal to or greater than a predetermined value. The engine output is reduced in the presence of the traction control signal. Changes up are produced at higher vehicle speeds in the presence of the traction control signal than in the absence of the traction control signal when the engine output is equal to or less than a predetermined value.

11 Claims, 3 Drawing Sheets

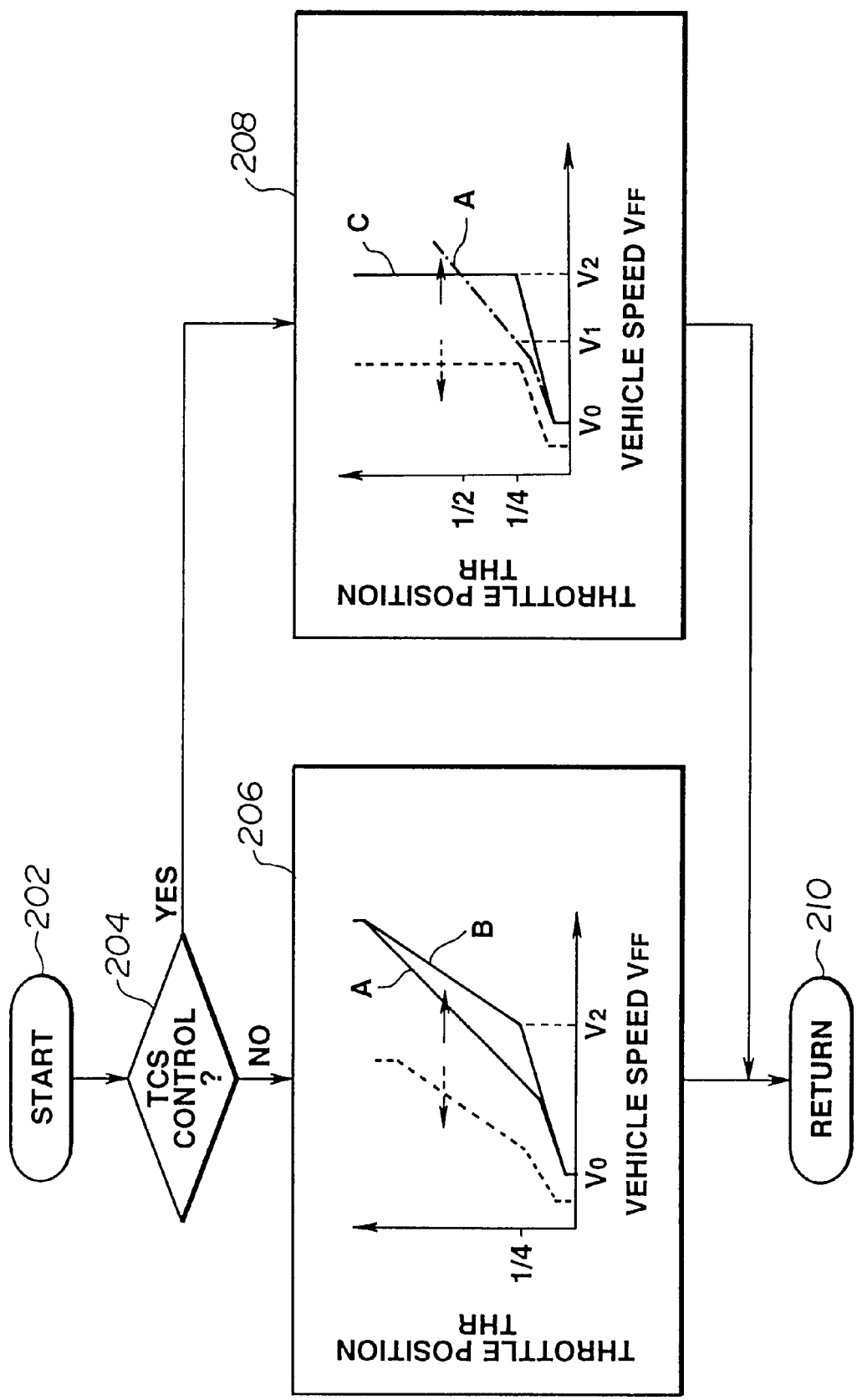

ENGINE OUTPUT CONTROL APPARATUS

BACKGROUND OF THE INVENTION

This invention relates to an apparatus for use with an automotive vehicle supported on a road surface by a pair of driven road wheels and a pair of non-driven road wheels to control an output transmitted from an internal combustion engine to the driven road wheels through an automatic transmission adapted to produce changes up based on engine output and vehicle speed.

A throttle valve is situated for rotation with an intake passage to control the amount of air permitted to enter an internal combustion engine through the intake passage, and thus the engine output torque transmitted from the engine to the driven road wheels of an automotive vehicle through an automatic transmission adapted to produce changes up based on engine output and vehicle speeds. In order to avoid lateral vehicle motions resulting from a great degree of slip of the road wheels during vehicle acceleration on an iced or snow-covered road surface, it has been proposed to perform a traction control with the use of an auxiliary throttle valve placed for rotation within the intake passage at a position upstream of the throttle valve. For the traction control, the auxiliary throttle valve is rotated in a closing direction to reduce the engine output torque and thus the driving forces transmitted to the driven road wheels when the difference between the speeds of rotation of the driven and non-driven road wheels.

It is preferable to further reduce the tendency of the road wheels to slip by advancing the time at which a change up is produced in the automatic transmission so as to reduce the driving torque transmitted to the driven road wheels during the traction control. However, this engine output control causes the engine speed from overshooting and undershooting a required value repetitively until the slip is converged below a predetermined degree. The degree of slip of the driven road wheels will increase particularly when the engine speed overshoots the required value.

SUMMARY OF THE INVENTION

It is a main object of the invention to provide an improved engine output control apparatus which can minimize the degree of slip of the driven road wheels resulting from engine speed fluctuations during traction control.

There is provided, in accordance with the invention, an apparatus for use with an automotive vehicle supported on a road surface by at least one pair of driven road wheels to control an output transmitted from an internal combustion engine to the driven road wheels through an automatic transmission adapted to produce changes up based on engine output and vehicle speed. The engine output control apparatus comprises slip detecting means for detecting a degree of slip of the driven road wheels with respect to the road surface, means for producing a traction control signal when the sensed degree of slip is equal to or greater than a predetermined value, and traction control means for reducing the engine output in the presence of the traction control signal. The engine output control apparatus also includes engine output detecting means for detecting the engine output, and shift up point shifting means for producing changes up at higher vehicle speeds in the presence of the traction control signal than in the absence of the traction control signal when the detected engine output is equal to or less than a predetermined value.

BRIEF DESCRIPTION OF THE DRAWINGS

This invention will be described in greater detail by reference to the following description taken in connection with the accompanying drawings, in which:

FIG. 3 is a flow diagram illustrating the programming of the digital computer as it is used to shift shift up points in the automatic transmission.

DETAILED DESCRIPTION OF TE INVENTION

Figure 1:
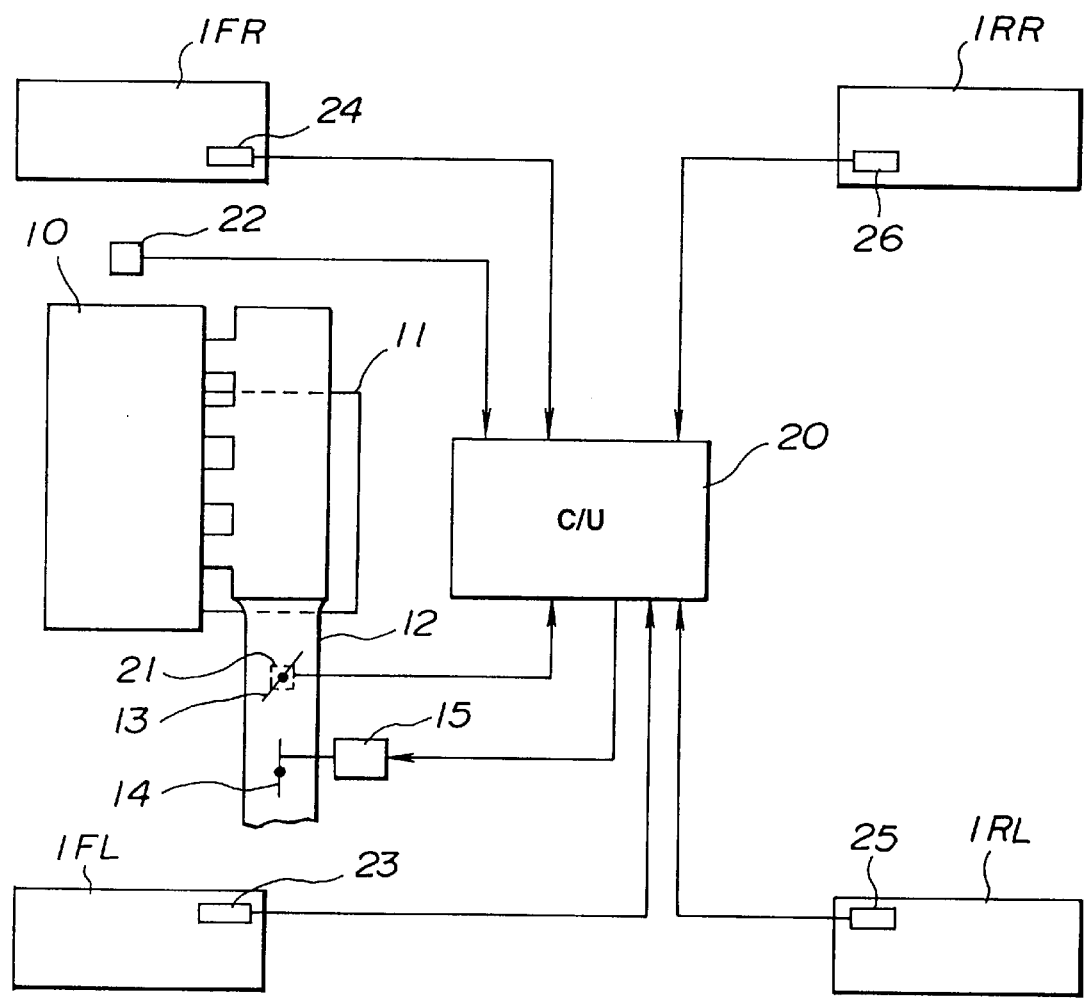
FIG. 1 is a schematic diagram showing one embodiment of an engine output control apparatus made in accordance with the invention.

With reference to the drawings and, in particular to FIG. 1, there is shown a schematic diagram of an engine output control apparatus embodying the invention. The invention will be described in connection with a front drive type automotive vehicle supported on a road surface by a pair of front road wheels 1FL and 1FR and a pair of rear road wheels 1RL and 1RR. A drive is transmitted from an internal combustion engine 10 to the front wheels 1FL and 1FR through an automatic transmission 11 adapted to produce changes up when the engine load (output) is light and changes down when the engine load is heavy. The engine 10 including an intake passage 12 having a main butterfly throttle valve 13 for controlling the amount of air permitted to enter the engine 10. The main throttle valve 13 is connected by a mechanical linkage to an accelerator pedal (not shown). The degree to which the accelerator pedal is depressed controls the degree of rotation of the main throttle valve 13. The greater the depression of the accelerator pedal, the greater the amount of air permitted to enter the engine 10. An auxiliary butterfly throttle valve 14 is situated at a position upstream of the main throttle valve 13 for rotation within the intake passage 12. The auxiliary throttle valve 14 is normally held at its open position and it is rotated toward its closed position by means of a valve actuator 15 operable to rotate the auxiliary throttle valve 14 in a closing direction to decrease the engine output and thus the vehicle driving force on a command from a control unit 20.

The control unit 20 performs such a traction control based upon main throttle valve position THR and a degree of slip of the driven road wheels 1FL and 1FR and also produces a change up at a change-up point determined as a function of main throttle valve position THR and vehicle speed V inferred from average driven road wheel speed $V_{FF}$. Thus, a throttle valve position sensor 21, an engine speed sensor 22, a front left road wheel speed sensor 23, a front right road wheel speed sensor 24, a rear left road wheel speed sensor 25 and a rear right road wheel speed sensor 26 are connected to the control unit 20. The throttle valve position sensor 21 is provided to sense the degree to which the main throttle valve 13 opens and it produces an electric signal indicative of the sensed main throttle valve position THR corresponding to the engine output load. The engine speed sensor 22 produces a series of engine crankshaft position electrical pulses of a repetition rate directly proportional to engine speed Ne. The front left road wheel speed sensor 23 is provided to sense the speed of rotation of the front left road wheel 1FL and it produces an electric signal indicative of the sensed front left road wheel speed $V_{WFL}$. The front right road wheel speed sensor 24 is provided to sense the speed of rotation of the front right road wheel 1FR and it produces an electric signal indicative of the sensed front right road wheel speed $V_{WFR}$. The rear left road wheel speed sensor 25 is provided to sense the speed of rotation of the rear left road wheel 1RL and it produces an electric signal indicative of the sensed rear left road wheel speed $V_{WRL}$. The rear right road wheel speed sensor 26 is provided to sense the speed of rotation of the rear right road wheel 1RR and it produces an electric signal indicative of the sensed rear right road wheel speed V$_{WRR}$.

The control unit 20 may employ a digital computer which includes a central processing unit (CPU), a read only memory (ROM), a random access memory (RAM), an input interface unit and an output interface unit. The central processing unit communicates with the rest of the computer. The input interface unit includes an analog-to-digital converter which receives analog signals from the main throttle valve position sensor 21 and other sensors and converts them into digital form for application to the central processing unit. The input interface unit also includes counters which count the pulses fed thereto from the speed sensors 22, 23, 24, 25 and 25 and convert the counts into engine and road wheel speed indication digital signals for application to the central processing unit. The read only memory contains the programs for operating the central processing unit and further contains appropriate data in look-up tables used in calculating appropriate values for the gear change up control.

Figure 2:
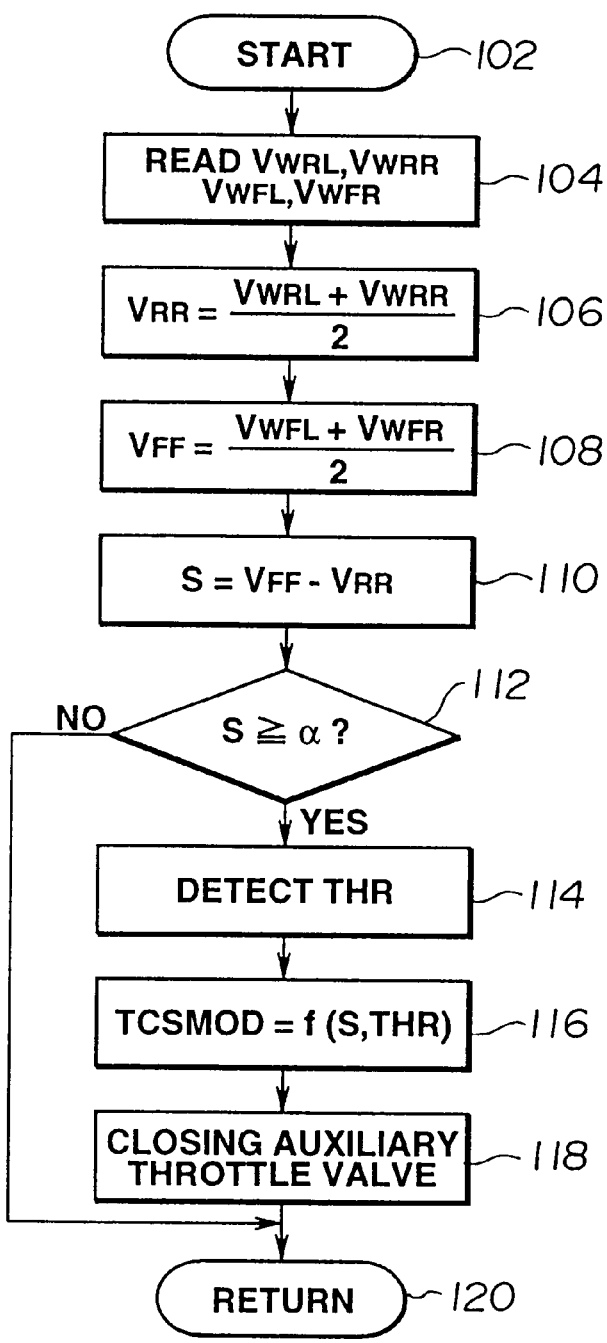
FIG. 2 is a flow diagram illustrating the programming of the digital computer as it is used to control the second throttle valve 14 (traction control)

FIG. 2 is a flow diagram illustrating the programming of the digital computer as it is used to control the second throttle valve 14 (traction control). The computer program is entered at the point 102. At the point 104 in the program, the front and rear road wheel speeds V$_{WFL}$, V$_{WFR}$, V$_{WRL}$ and V$_{WRR}$ are read into the computer memory. At the point 106, an average rear road wheel speed V$_{RR}$ is calculated as V$_{RR}$=(V$_{WRL}$+V$_{WRR}$)/2. At the point 108, an average front road wheel speed V$_{FF}$ is calculated as V$_{FF}$=(V$_{WFL}$+V$_{WFR}$)/2. At the point 110, a slip S of the driven road wheels 1FL and 1FR is calculated as S=(V$_{FF}$−V$_{RR}$).

At the point 112 in the program, a determination is made as to whether or not the calculated slip S is equal to or greater than a predetermined value α. If the answer to this question is "YES", then it means a demand for traction control and the program proceeds to the point 114. Otherwise, the program proceeds to the point 120 where the computer program is returned to the point 104. At the point 114, the degree THR of opening of the main throttle valve 13 is read into the computer memory. At the point 116, a target value TCSMOD for engine torque reduction is calculated as a function of slip S and main throttle valve position THR. The greater the slip S and the greater the main throttle valve position THR, the greater the target engine torque reduction value TSCMOD. At the point 118, the calculated target value is transferred by the central processing unit into the output interface unit which thereby produce a control signal causing the valve actuator 15 to rotate the auxiliary throttle valve 14 in a closing direction by a degree corresponding to the calculated target value TCSMOD. Following this, the program proceeds to the point 120.

FIG. 3 is a flow diagram illustrating the programming of the digital computer as it is used to shift shift up points in the automatic transmission 11. The computer program is entered at the point 202. At the point 204 in the program, a determination is made as to whether or not the engine is operating with the traction control (TCS). If the answer to this question is "No", then the program proceeds to the point 206 where a normal change up characteristic is selected for gear change up control. The normal change up characteristic is indicated by the character A in the block 206 and it determines a shift up point as a function of vehicle speed (average rear road wheel speed V$_{FF}$) and main throttle valve position THR. If the operator operates a switch to select a power mode, another change up characteristic, as indicated by the character B in the block 206, is selected to provide a greater weight on vehicle acceleration performance. With the use of the change up characteristic B, the changes up occur at higher vehicle speeds than the corresponding changes up with the use of the normal change up characteristic A. Following this, the program proceeds to the point 210 where the computer program is returned to the point 204.

If the answer to the question inputted at the point 204 is "YES", then the program proceeds to the point 208 where a TCS control change up characteristic, as indicated by the character C in the block 208, is selected for gear change up control. The TCS control change up characteristic C is arranged to retard the time at which changes up occur at low engine outputs. In other words, the TCS control change up characteristic C is arranged to produce changes up at higher vehicle speeds than the corresponding changes up produced with the use of the normal change up characteristic A indicated by the one-dotted lines in the block 208, at low engine outputs, that is, when the main throttle valve position THR is less than a predetermined value, for example, a value corresponding to one half of the angle at which the main throttle valve 13 opens fully. For example, the normal change up characteristic A is arranged to produce a change up at a vehicle speed of V when the main throttle valve 13 is closed and at a vehicle speed of V1 when the main throttle valve 13 opens at an angle corresponding to one-forth of the angle at which the main throttle valve 13 opens fully. The TCS control change up characteristic C is arranged to produce a change up at a vehicle speed of V0 when the main throttle valve 13 opens at an angle corresponding to one-fourth of the angle at which the main throttle valve 13 opens fully. A great engine speed overshoot occurs because of a great traction control response delay at low engine outputs. It is possible to suppress the slip resulting from such a great engine speed overshoot by retarding the time at which a change up is produced, that is, by producing a change up at a higher vehicle speed, at low engine outputs where the main throttle valve position THR is less than a value corresponding to one-half of the angle at which the main throttle valve 13 opens fully.

Furthermore, the TCS control change up characteristic C is arranged to advance the time at which changes up occur at high engine outputs. In other words, the TCS control change up characteristic C is arranged to produce changes up at lower vehicle speeds than the corresponding changes up produced with the use of the normal change up characteristic A and also with the use of the another change up characteristic B, at high engine outputs, that is, when the main throttle valve position THR is equal to or greater than a predetermined value, for example, a value corresponding to one half of the angle at which the main throttle valve 13 opens fully. The driven road wheels tend to slip because of engine rotation inertia force at high engine loads when a change up occurs at a high engine speed. It is possible to suppress this tendency by advancing the time at which a change up is produced, that is, by producing a change up at a lower vehicle speed, at high engine outputs.

Although the main throttle valve position THR is used as a parameter to detect a low engine output condition, it is to be understood such a low engine output condition may be detected when the engine speed is less than a predetermined value. In this case, the vehicle speeds V0 and V2 of the change up characteristic used at the point 208 of the program of FIG. 3 may be set as a function of engine speed Ne. Although the invention has been described in connection with a traction control made by rotating the auxiliary throttle valve 14 in a closing direction, it is to be understood that the traction control may be made by fuelcut control, ignition timing retardation control, or supercharging degree reduction control. If the throttle valve is controlled through an electrical connection to the control unit rather than the mechanical linkage to the accelerator pedal, the traction control may be made by rotating the throttle valve in a closing direction.

What is claimed is:

1. An apparatus for use with an automotive vehicle supported on a road surface by at least one pair of driven road wheels to control an output transmitted from an internal combustion engine to the driven road wheels through an automatic transmission adapted to produce changes up based on engine output and vehicle speed, comprising:

slip detecting means for detecting a degree of slip of the driven road wheels with respect to the road surface;

means for producing a traction control signal when the sensed degree of slip is equal to or greater than a predetermined value;

traction control means for reducing the engine output in the presence of the traction control signal;

engine output detecting means for detecting the engine output; and shift up point shifting means for producing changes up at higher vehicle speeds in the presence of the traction control signal than in the absence of the traction control signal when the detected engine output is equal to or less than a predetermined value;

wherein the shift up point shifting means includes means for producing changes up at lower vehicle speeds in the presence of the traction control signal than in the absence of the traction control signal when the detected engine output is greater than the predetermined value.

2. The engine output control apparatus as claimed in claim 1, wherein the automotive vehicle is supported by a pair of driven road wheels and a pair of non-driven road wheels, which includes means for detecting a speed of rotation of the driven road wheels, and means for detecting a speed of rotation of the non-driven road wheels, and wherein the slip detecting means includes means for detecting the degree of slip of the driven road wheels based on the speeds of rotation of the driven and non-driven road wheels.

3. The engine output control apparatus as claimed in claim 1, wherein the engine output detecting means includes means for detecting a degree to which an accelerator pedal is depressed, and wherein the shift up point shifting means includes means for producing changes up at higher vehicle speeds in the presence of the traction control signal than in the absence of the traction control signal when the detected degree to which the accelerator pedal is depressed is equal to or less than a predetermined value.

4. The engine output control apparatus as claimed in claim 1, wherein the engine output detecting means includes means for detecting a speed of rotation of the engine, and wherein the shift up point shifting means includes means for producing changes up at higher vehicle speeds in the presence of the traction control signal than in the absence of the traction control signal when the detected engine speed is equal to or less than a predetermined value.

5. The engine output control apparatus as claimed in claim 1, wherein a determination to change up is based on at least the detected engine output and the vehicle speed both in the presence and the absence of the traction control signal.

6. An apparatus for use with an automotive vehicle supported on a road surface by at least one pair of driven road wheels to control an output transmitted from an internal combustion engine to the driven road wheels through an automatic transmission adapted to produce changes up based on engine output and vehicle speed, comprising:

slip detecting means for detecting a degree of slip of the driven road wheels with respect to the road surface;

means for producing a traction control signal when the sensed degree of slip is equal to or greater than a predetermined value;

traction control means for reducing the engine output in the presence of the traction control signal;

engine output detecting means for detecting the engine output; and shift up point shifting means for producing changes up at higher vehicle speeds in the presence of the traction control signal than in the absence of the traction control signal when the detected engine output is equal to or less than a predetermined value;

wherein the engine output detecting means includes means for detecting a speed of rotation of the engine, and wherein the shift up point shifting means includes means for producing changes up at higher vehicle speeds in the presence of the traction control signal than in the absence of the traction control signal when the detected engine speed is equal to or less than a predetermined value.

7. The engine output control apparatus as claimed in claim 6, wherein the automotive vehicle is supported by a pair of driven road wheels and a pair of non-driven road wheels, which includes means for detecting a speed of rotation of the driven road wheels, and means for detecting a speed of rotation of the non-driven road wheels, and wherein the slip detecting means includes means for detecting the degree of slip of the driven road wheels based on the speeds of rotation of the driven and non-driven road wheels.

8. The engine output control apparatus as claimed in claim 6, wherein a determination to change up is based on at least the detected engine output and the vehicle speed both in the presence and the absence of the traction control signal.

9. An apparatus for use with an automotive vehicle supported on a road surface by at least one pair of driven road wheels to control an output transmitted from an internal combustion engine to the driven road wheels through an automatic transmission, comprising:

means for detecting vehicle speed;

slip detecting means for detecting a degree of slip of the driven road wheels with respect to the road surface;

means for producing a traction control signal when the sensed degree of slip is equal to or greater than a predetermined value;

traction control means for reducing the engine output in the presence of the traction control signal;

engine output detecting means for detecting the engine output; and shift up point shifting means for producing changes up at higher vehicle speeds in the presence of the traction control signal than in the absence of the traction control signal when the detected engine output is equal to or less than a predetermined value, wherein a determination to change up is based on at least the detected engine output and the detected vehicle speed both in the presence and the absence of the traction control signal.

10. The engine output control apparatus as claimed in claim 9, wherein the automotive vehicle is supported by a pair of driven road wheels and a pair of non-driven road wheels, which includes means for detecting a speed of rotation of the driven road wheels, and means for detecting a speed of rotation of the non-driven road wheels, and wherein the slip detecting means includes means for detecting the degree of slip of the driven road wheels based on the speeds of rotation of the driven and non-driven road wheels.

11. The engine output control apparatus as claimed in claim 9, wherein the engine output detecting means includes means for detecting a degree to which an accelerator pedal is depressed, and wherein the shift up point shifting means includes means for producing changes up at higher vehicle speeds in the presence of the traction control signal than in the absence of the traction control signal when the detected degree to which the accelerator pedal is depressed is equal to or less than a predetermined value.

* * * * *